United States Patent [19]

Gumacos

[11] Patent Number: 4,584,694
[45] Date of Patent: Apr. 22, 1986

[54] METHOD AND APPARATUS FOR ESTIMATING BAUD RATE

[75] Inventor: Constantine Gumacos, Broomall, Pa.

[73] Assignee: RCA Corporation, Princeton, N.J.

[21] Appl. No.: 632,468

[22] Filed: Jul. 19, 1984

[51] Int. Cl.<sup>4</sup> ............... H04B 3/46; H04B 17/00; G06F 7/38

[52] U.S. Cl. ............................ 375/75; 375/10; 364/484; 364/487; 364/715

[58] Field of Search ............... 364/701, 702, 703, 484, 364/487, 486, 715; 375/75, 10; 370/84

[56] References Cited

U.S. PATENT DOCUMENTS 4,453,550 6/1984 Flax ........................... 128/660
4,484,291 11/1984 Schlösser ..................... 364/484

Primary Examiner—Marc E. Bookbinder
Assistant Examiner—Andrew J. Telesz, Jr.
Attorney, Agent, or Firm—Joseph S. Tripoli; Robert L. Troike; Christopher L. Maginniss

[57] ABSTRACT

The baud rate of a digital signal is estimated using a method based on a mean squared error determination. The disclosed method fits a sine wave curve to the digital signal and varies its frequency until the mean squared error is a minimum, wherein the error is defined as the distance of the sine wave curve from its center line at each transition of the digital signal. The disclosure includes an apparatus for carrying out the method of the invention. In addition, the method is suitable for execution as a stored program within a high-speed signal processor.

13 Claims, 3 Drawing Figures

METHOD AND APPARATUS FOR ESTIMATING BAUD RATE

The Government has rights in this invention pursuant to a Government Contract.

This invention relates generally to digital communications and, more particularly, to an apparatus and method for estimating the baud rate of a demodulated digital signal.

In a typical digital communications system, a signal is transmitted from a sending terminal to a receiving terminal where it is demodulated to separate the carrier signal from the information signal. The demodulated signal is then converted, via an analog-to-digital converter, to a digital information signal. In such a system, knowledge of the baud rate of the transmitted signal, i.e., the number of symbols transmitted per second, can be used advantageously at the receiving terminal for improved reception quality. For example, if the baud rate is known, a sampling signal of frequency equal to the baud rate can be used to sample the demodulated digital information signal at the approximate midpoint of each bit period.

When, however, the baud rate is not known a priori to the receiver, as, for example, when the transmissions of an unfriendly instrumentality are being intercepted, it is necessary to estimate the rate based on, inter alia, the observed high-to-low and low-to-high transitions of the demodulated digital signal. One commonly used method for obtaining this estimation involves measuring the time durations between successive transitions of the digital signal over an extended period of the transmission, tallying the number of these time durations as a function of quantized time intervals, and constructing an histogram from the tallied data. Assuming that a sufficient number of transitions are measured, this histogram, after being properly adjusted by smoothing and weighting functions, will exhibit a peak from which the baud rate can be determined.

A major drawback of the histogram method is the large number of transition times which must be measured. In order to achieve a reasonable degree of accuracy of the baud rate, a very large number of samples must be taken followed by relatively complex curve-fitting processing of the data. At low baud rates, this method may consume several seconds—an unreasonable delay in the domain of message interception.

In accordance with the principles of the present invention, a method is disclosed for estimating the baud rate, f, of a digital signal having N successive transitions occurring at times $T(1), T(2), \ldots, T(N)$, wherein the transitions include high-to-low and low-to-high transitions. The method includes a single step of determining a value of f for which the expression $$\left[\sum_{i=1}^{N} \sin 4\pi f T(i)\right]^2 + \left[\sum_{i=1}^{N} \cos 4\pi f T(i)\right]^2$$

assumes a maximum value.

Other features and advantages of the present invention will be more fully understood from the following detailed description of the preferred embodiment, the appened claims, and the accompanying drawings, in which:

Figure 1:
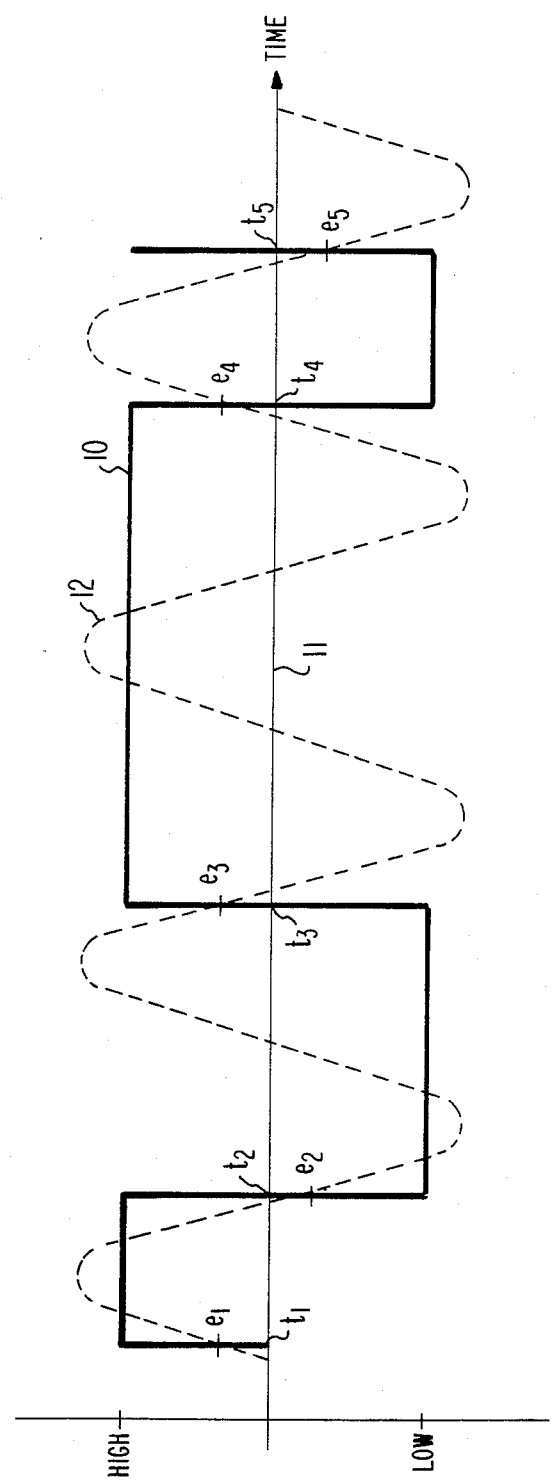
FIG. 1 illustrates a typical digital signal having a baud-rate-estimated analog signal superimposed thereon.

Referring to FIG. 1, a digital signal 10 is shown having low-to-high and high-to-low transitions at apparently irregular instances in time. It is convenient to draw the time axis as a "zero-line" 11, passing through the approximate midpoints between the high and low values of digital signal 10, and to refer to the points where signal 10 crosses through zero-line 11 as "zero crossings." The word "zero" in this instance does not impart information about the voltage level of the signal nor about its digital value, but is merely a term of art to identify the approximate midpoint of the transitions between digital values.

Superimposed on digital signal 10 is waveform 12, a single frequency sinusoidal wave which is shown as symmetric about zero-line 11. For a properly chosen frequency and phase angle of waveform 12, each zero crossing of digital signal 10 occurs in close proximity to a point where waveform 12 crosses zero-line 11. In order to establish a criterion of closeness between the zero crossings of signal 10 and those of waveform 12, I have selected the mean squared error method, which is the traditional method of curve fitting. This method involves finding a curve which approximates a number of predetermined data points such that the mean squared error between the curve and the data is minimized.

Using this method, one might intuitively establish as the error condition the distance (in time) between a zero crossing of digital signal 10 and the closest zero crossing of waveform 12. This intuitive approach, however, does not lend itself immediately to a tractable solution. Furthermore, this approach may give ambiguous results in that the second, third, etc., harmonics of the frequency of the best-fitting waveform 12 will exhibit the same minimum mean squared error as the fundamental.

I have chosen, therefore, as the error condition, not the time intervals between the zero crossings of signal 10 and waveform 12, but rather the amplitude of waveform 12 at the zero crossing time of digital signal 10. By "amplitude" is meant the scalar value of the distance of waveform 12 from zero-line 11. As may be readily seen from FIG. 1, the error at the zero crossing occurring at time $t_1$ is $e_1$, the error corresponding to the zero crossing at time $t_2$ is $e_2$, etc. Therefore, for a sampling period of N zero crossings, the means squared error may be represented as $$\vec{e^2} = (1/N) \sum^{i} e_i^2.$$

It may be easily seen that the errors $e_i$ for the harmonics of the frequency of waveform 12 would be larger than the corresponding errors of the fundamental, and would therefore not provide the same minimum mean squared error as the fundamental.

In the paragraphs that follow, there is developed a mathematical algorithm for computing the baud rate that minimizes the mean squared error between the observed zero crossings and their ideal positions, i.e., the zero crossings of the baud-rate-estimated waveform. A mathematical statement of this problem and its solution are briefly stated.

Let $\tau_1, \tau_2, \ldots, \tau_N$ represent the observed times of N zero crossing occurrences. I will define the error $e_i$ between the ith zero crossing and a sinusoidal wave of frequency f as $$e_i = \sin(\omega\tau_i + \phi) \text{ for } i = 1, 2, \ldots, N$$

where $\omega = 2\pi f$ and $\phi$ is some unknown phase angle.

The problem I propose to solve is to find $\omega$ and $\phi$ such that the mean squared error $\overline{e^2}$ is a minimum, where $$\overline{e^2} = (1/N) \sum_{i=1}^{N} e_i^2 = (1/N) \sum_{i=1}^{N} \sin^2(\omega\tau_i + \phi) \quad (1)$$

Expanding the right-hand side of Equation (1), $$\overline{e^2} = \tfrac{1}{2} - (1/2N) \sum_{i=1}^{N} \cos(2\omega\tau_i + 2\phi). \quad (2)$$

Minimizing $\overline{e^2}$ is therefore equivalent to maximizing the second term in the right-hand side of Equation (2), i.e., let F assume a maximum value, where $$F = (1/2N) \sum_{i=1}^{N} \cos(2\omega\tau_i + 2\phi). \quad (3)$$

Expanding the cosine term gives $$F = (1/2N) \sum_{i=1}^{N} [\cos 2\phi \cos 2\omega\tau_i - \sin 2\phi \sin 2\omega\tau_i]. \quad (4)$$

In order to find the value of the phase angle $\phi$ for which F is a maximum, I have set the partial derivative of F with respect to $\phi$ equal to zero and solved for $\cos 2\phi$ and $\sin 2\phi$.

$$\partial F/\partial \phi = (1/2N) \sum_{i=1}^{N} (-2\sin 2\phi \cos 2\omega\tau_i - 2\cos 2\phi \sin 2\omega\tau_i) = 0 \quad (5)$$

$$\cos 2\phi = \sum_{i=1}^{N} \cos 2\omega\tau_i \Big/ \sqrt{\left(\sum_{i=1}^{N} \cos 2\omega\tau_i\right)^2 + \left(\sum_{i=1}^{N} \sin 2\omega\tau_i\right)^2} \quad (6)$$

$$\sin 2\phi = -\sum_{i=1}^{N} \sin 2\omega\tau_i \Big/ \sqrt{\left(\sum_{i=1}^{N} \cos 2\omega\tau_i\right)^2 + \left(\sum_{i=1}^{N} \sin 2\omega\tau_i\right)^2} \quad (7)$$

Substituting Equations (6) and (7) into the expression for F in Equation (4), $$F = (\tfrac{1}{2}N) \sqrt{\left(\sum_{i=1}^{N} \cos 2\omega\tau_i\right)^2 + \left(\sum_{i=1}^{N} \sin 2\omega\tau_i\right)^2}. \quad (8)$$

Finally, since F is always a positive value, maximizing F is equivalent to maximizing $F^2$. Therefore, the original problem of finding values of $\omega$ and $\phi$ to minimize $\overline{e^2}$ has been reduced to finding an $\omega$ which maximizes $F^2$, i.e., $$F^2 = (\tfrac{1}{4}N^2) \left[ \left(\sum_{i=1}^{N} \cos 2\omega\tau_i\right)^2 + \left(\sum_{i=1}^{N} \sin 2\omega\tau_i\right)^2 \right]. \quad (9)$$

The term $\tfrac{1}{4}N^2$ is a constant and will be omitted in further references to $F^2$, such that, $$F^2 = \left(\sum_{i=1}^{N} \cos 2\omega\tau_i\right)^2 + \left(\sum_{i=1}^{N} \sin 2\omega\tau_i\right)^2. \quad (10)$$

The proposed approach to maximize $F^2$ is to compute $F^2$ for a range of $\omega$'s (or, equivalently, f's, where $\omega = 2\pi f$) and select the value of $\omega$ (or f) which produces the maximum value for $F^2$. The search for the maximum $F^2$ is conducted from a minimum value of f, $f_{min}$, to a maximum, $f_{max}$, in incremental steps $\Delta f$. The minimum value $f_{min}$ is given by $f_{min} = (N-1)/2(\tau_N - \tau_1)$. This value is readily deduced from the fact that if N zero crossings are observed in $\tau_N - \tau_1$ seconds, it is physically impossible to construct a sine wave of frequency less than $f_{min}$ and have N zero crossings in the interval $\tau_N - \tau_1$. The maximum limit, $f_{max}$ is based on a priori knowledge of the physical device producing the waveform. More specifically, $f_{max}$ will be proportional to the band-width of the device that produced the observed waveform.

Finally, the incremental frequency, $\Delta f$, is based on the Nyquist criterion. Briefly stated, a signal s(t) of the form $$s(t) = \sum^{k} \sin(2\pi f_k t + \theta_k),$$

can be precisely reproduced from samples taken at time intervals $T_s$, given by $T_s = \tfrac{1}{2} f_{max}$, where $f_{max}$ is the maximum value that $f_k$ may take. Since the sine function $\sin 2\pi ft$ is symmetric in f and t, one may apply the Nyquist criterion in the frequency domain, namely, if $$S(f) = \sum^{j} \sin(2\pi f t_j + \psi_j),$$

then the function S(f) can be precisely reconstructed from frequency samples taken at intervals $f_s$ given by $f_s = \tfrac{1}{2} t_{max}$, where $t_{max}$ is the maximum value that $t_j$ may assume. Applying the Nyquist criterion to the function $F^2$, it can readily be seen that the maximum value that the argument of the sine and cosine functions can assume is $2\pi$ times $4f\tau_N$, and therefore the Nyquist sampling interval $\Delta f$ is given by $\Delta f = \tfrac{1}{8}\tau_N$. (The $4f\tau_N$ factor above comes from squaring the $\cos 2\omega\tau_N$ and $\sin 2\omega\tau_N$ terms.) In practice, a smaller sampling interval would be used.

Figure 2:
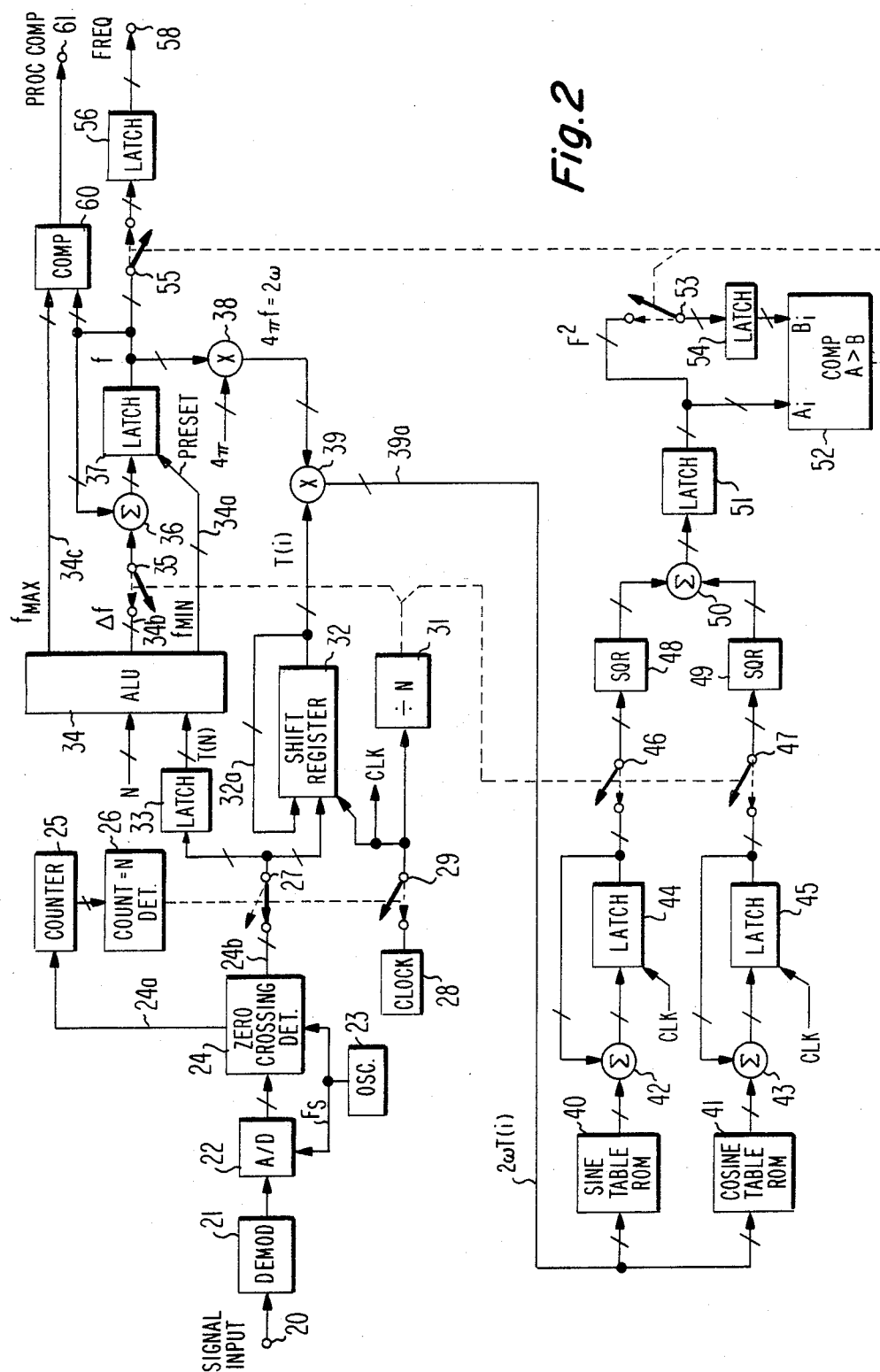
FIG. 2 illustrates, in detailed block diagram form, an apparatus for determining the baud rate of a digital signal according to the present invention.

Referring now to FIG. 2, there is shown a detailed block diagram of an apparatus suitable for carrying out the baud rate estimation procedure of the present invention as developed above. It will be recognized that all of the elements shown in FIG. 2 and functionally described within the text that follows are commonly-used analog or digital devices, and that no further elaboration on these elements is required. Where switches are shown, it will be recognized that they are thus depicted for improved understanding of the function and that, in an actual hardware implementation, solid-state devices such as transistors or gates would preferably be used. The convention to be followed with regard to these switches, viz., switches 27, 29, 35, 46, 47, 53 and 55, is that the solid line position represents the relaxed state and the dashed line position represents the active state, as when the controlling influence (shown as a dashed line) is enabled.

An input signal is applied at input terminal 20 which couples the signal to demodulator 21 where the carrier signal is removed. The demodulated signal is passed to analog-to-digital converter 22 which samples the incoming analog signal at a frequency rate $F_s$, by way of a signal generated from oscillator 23. The digital output signal from converter 22, which may typically provide eight to twelve bits carried on a like number of signal leads, is applied to zero crossing detector 24 which compares the magnitude of the digital signal, i.e., its arithmetic digital value, with a predetermined value representing the approximate midpoint, or zero crossing point, of the extreme values which can be assumed by the digital signal.

Detector 24 provides two output signals—one is a pulse carried on a single lead 24a coupled to counter 25 which occurs at each zero crossing detection; the second is a digital signal, typically sixteen bits in width, which provides the time of occurrence information of each zero crossing, $T(i)$, on signal leads 24b, via switch 27, to latch 33 and shift register 32. In the present embodiment, oscillator 23 applies a signal of frequency $F_s$ to detector 24 in order to provide the timing basis for the $T(i)$ signals. As long as switch 27 remains closed, the time of occurrence of each zero crossing is stored in shift register 32, which may suitably have dimensions of 16 bits (width) by N bits (length). On the other hand, latch 33 is suitably dimensioned 16 bits by one bit, and stores only the latest time of occurrence information received. Thus, after N zero crossing occurrences, shift register 32 contains $T(1), T(2), \ldots, T(N)$, and latch 33 contains $T(N)$.

Counter 25 counts the zero crossing pulses, and COUNT=N detector 26 decodes the occurrence of the Nth zero crossing and activates switches 27 and 29 for the duration of the baud rate estimation procedure. The activation of switch 27 causes its terminals to open, thus preventing any further zero crossing time of occurrence from reaching shift register 32 or latch 33. The activation of switch 29 enables clock source 28 to provide a data processing clock signal, CLK, to the apparatus. Divider 31, responsive to the CLK signal after closure of switch 29, provides an output control signal after each Nth occurrence of the CLK signal. This output control signal activates switches 35, 46 and 47 for such purposes as will be described in later paragraphs.

Arithmetic logic unit (ALU) 34 computes values of $f_{min}$, the minimum frequency to be tested during the estimation procedure; $\Delta f$, the increment by which the tested frequency is augmented; and $f_{max}$, the maximum frequency to be tested. The computation of $f_{min}$ may be determined by the values of $T(N)$ and N, applied at input terminals of ALU 34, according to $$f_{min} = (N-1)/2[T(N)-T(1)].$$

$T(1)$ is typically assumed as the zero reference time. The computation of $\Delta f$ follows the Nyquist criterion discussion above and takes on a value $\Delta f \leq \frac{1}{2}T(N)$. The value of $f_{max}$ may be determined by external influences such as limiting characteristics of a filter in the signal path or by a limit in the range of interest.

A digital signal representing the minimum frequency, $f_{min}$, is applied via signal leads 34a to the preset input terminals of latch 37. A digital signal representing the frequency increment, $\Delta f$, is applied via signal leads 34b to switch 35 which, when activated, applies the $\Delta f$ signal to a first set of input terminals of summer 36. A digital signal representing the maximum frequency, $f_{max}$, is applied via signal leads 34c to one set of inputs of comparator 60.

The output signal from summer 36 is applied to latch 37, which is typically 16 bits in width. The latch output signal is coupled back to a second set of input terminals of summer 36. Thus, in operation, latch 37 initially holds the value of $f_{min}$, and, after each N occurrences of the CLK signal, switch 35 enables the value of $\Delta f$ into summer 36, thereby incrementing by $\Delta f$ the contents of latch 37. Comparator 60 compares the value of the $f_{max}$ signal from ALU 34 with the contents of latch 37; when the values of the latch 37 contents exceed the value of the $f_{max}$ signal, comparator 60 generates at output terminal 61 a PROC COMP signal, indicating that the baud rate estimation procedure is complete.

Latch 37 contains f, the digital representation of the frequency being tested, also referred to as the working frequency. The value of f is multiplied in multiplier 38 by the digital representation of $4\pi$, giving a result of $4\pi f$, or $2\omega$. The value of $2\omega$ is multiplied by the output signal of shift register 32 in multiplier 39.

It was noted earlier that shift register 32 contains the N values of $T(i)$, from $T(1)$ through $T(N)$. Shift register 32 is caused to shift its contents in an endless ring by virtue of signal leads 32a which loop the output signal to its input terminals. Thus, for each value of $2\omega$ presented to one set of inputs of multiplier 39, all N values of $T(i)$ are presented to the other set of inputs, resulting in a sequence of output signals from multiplier 39 of $2\omega T(1), 2\omega T(2), \ldots 2\omega T(N)$, which are applied to the addressing input terminals of sine table ROM 40 and cosine table ROM 41.

ROM 40 is preprogrammed with the sine function of the argument applied to its address input terminals. Thus, the output signal of ROM 40 is a digital representation of the sine of the angle (in radians) presented at its input terminals. This output signal, $\sin 2\omega T(i)$, is coupled to a first set of input terminals of summer 42. Similarly, ROM 41 is preprogrammed with the cosine function of the argument applied to its address input terminals. Thus, the output signal of ROM 41 is a digital representation of the cosine of the angle (in radians) presented at its input terminals. This output signal, $\cos 2\omega T(i)$, is coupled to a first set of input terminals of summer 43.

The output signals of summers 42 and 43 are applied, respectively, to the input terminals of latches 44 and 45, both of which are suitably sixteen bits in width. The output signals of latches 44 and 45 are coupled, respectively, to a second set of input terminals of summers 42 and 43. Latches 44 and 45 are both clocked by the CLK signal, so that at the end of N CLK occurrences, latch 44 contains the digital representation of $$\sum_{i=1}^{N} \sin 2\omega T(i)$$

and latch 45 contains the digital representation of $$\sum_{i=1}^{N} \cos 2\omega T(i).$$

Switches 46 and 47 are enabled to their closed positions upon the decode of N occurrences of the CLK signal by divider 31, i.e., when latches 44 and 45 have received the Nth recursion in the sequences of sine and cosine data, respectively. The closure of switches 46 and 47 enables the contents of latches 44 and 45 to devices 48 and 49, respectively, which perform arithmetic squaring functions on the digital data applied thereto. Thus, the output signal applied by device 48 to a first set of input terminals of summer 50 is the square of the sum of the sine functions, and the output signal applied by device 49 to a second set of input terminals of summer 50 is the square of the sum of the cosine functions. The resulting output signal from summer 50, which is stored in latch 51 (suitably 16 bits in width) is $$\left[\sum_{i=1}^{N} \sin 2\omega T(i)\right]^2 + \left[\sum_{i=1}^{N} \cos 2\omega T(i)\right]^2,$$

which is precisely the $F^2$ function derived earlier and presented in Equation (10).

The output signal of latch 51, $F^2$, is applied to the $A_i$ input terminals of digital comparator 52 which compares the value of the A input signal to a B input signal, which is stored in latch 54 and applied to comparator 52 at the $B_i$ input terminals. If the result of this comparison is such that A is greater than B, the comparator 52 generates an output signal which activates switches 53 and 55.

Activation of switch 53 causes it to close, enabling the signal representing the current value of $F^2$ into latch 54. Activation of switch 55 enables the signal at the output terminals of latch 37, representing the working frequency, f, to latch 56. The latch 56 output signal is a digital signal, FREQ, representing the working frequency, and is coupled to output ports 58.

It will be understood that when the $F^2$ value stored in latch 51 exceeds the value of the signal stored in latch 54, a new maximum value of $F^2$ has been computed and, therefore, the value stored in latch 37 corresponds to a frequency which minimizes the mean squared error. Hence, switch 53 enables this maximum value of $F^2$ to be saved in latch 54, and switch 55 enables the corresponding frequency-related signal in latch 37 to be saved in latch 56.

After elements 40–50 have completed the computation of $F^2$ using the value of $2\omega$ provided from multiplier 38, and after comparator 52 has determined whether or not to activate switches 53 and 55, the $\Delta f$ signal generated by ALU 34 on lead 34b passes through the closed contacts of switch 35 (since CLK=N and the switch control signal from divider 31 is active). The $\Delta f$ signal augments, in summer 36, the value of the working frequency stored in latch 37, and the augmented value is restored therein. Thus, unless comparator 60 determines that the maximum frequency to be tested has been surpassed, the process involving elements 40–50 repeats using the new frequency value.

Certain relatively trivial functions, which entail more detail than the level of FIG. 2 justifies, have been omitted from the drawing and its description. Such functions include the clearing of latches 44 and 45 after their contents have been enabled out through switches 46 and 47, the clearing of latch 54 prior to the processing of the T(i) data stored in shift register 32, the detailed timing and control of the switches, and, in general, the detailed timing functions of data transfer into the latches. The implementation of these functions is well within the ordinary skill of one knowledgeable in the art.

Figure 3:
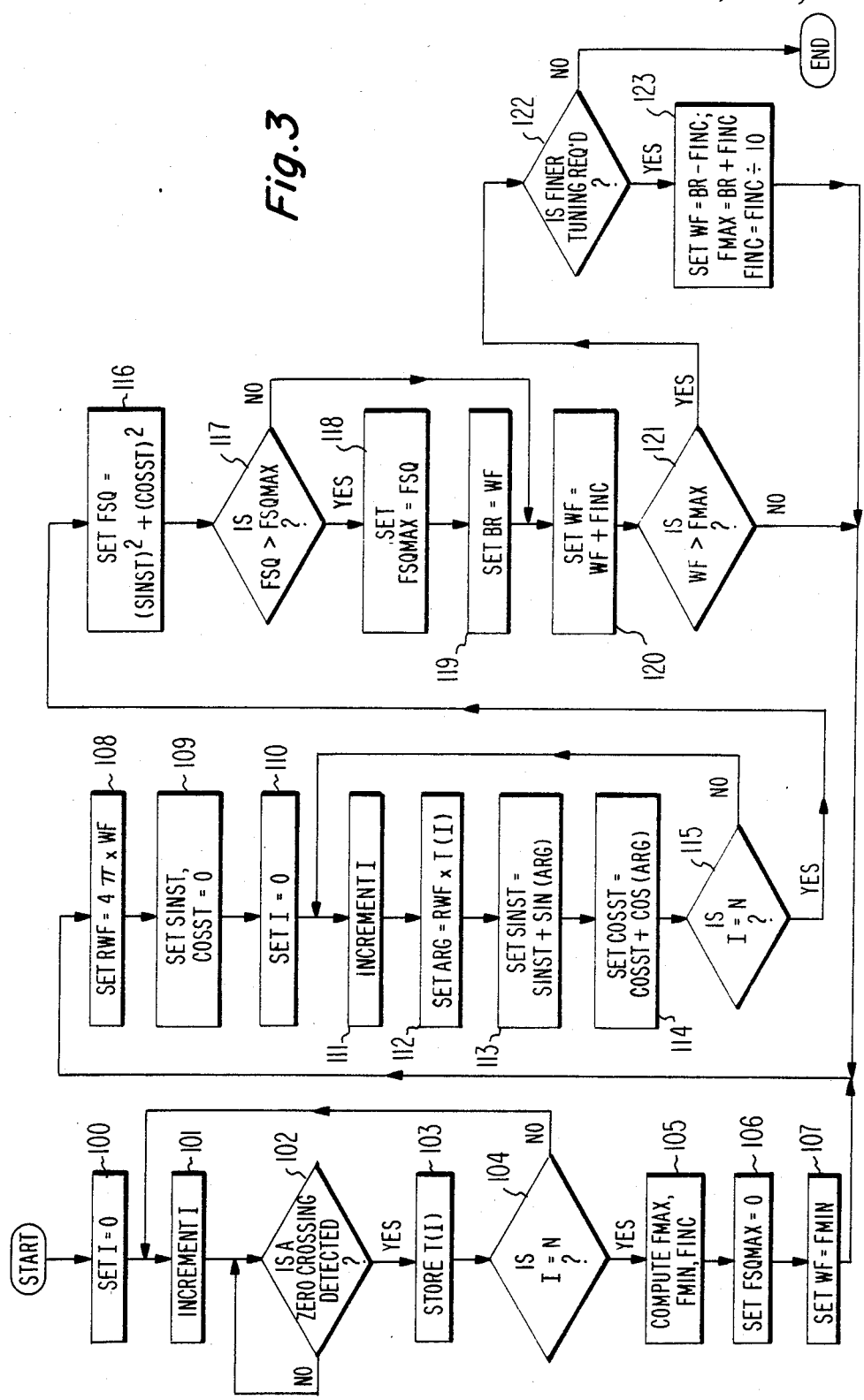
FIG. 3 is a flow diagram of the steps of a method for determining the baud rate of a digital signal according to the present invention.

Referring now to FIG. 3, there is shown a flow diagram of the steps which may be followed in order to practice the method of the present invention. These steps 100 through 123 may be performed by the elements of the apparatus of FIG. 2 embodiment, or they may be executed by a special purpose signal processor.

The major portions of the method may be grouped as follows: steps 100 through 104 measure the times of occurrence of N zero crossings of the incoming digital signal 10; steps 105 through 110 set the indexes and the parameter values of the mean squared error minimizing process; steps 111 through 121 execute the error minimizing process; and steps 122 and 123 reset the process parameters if a more precise value of baud rate is required.

At step 100, an index I, representing the number of zero crossings of digital signal 10, is initialized to zero. At step 101, index I is incremented by one. The process then waits at step 102 until a zero crossing is detected, whereupon the time of detection, T(I), is stored at step 103. If the required number of zero crossings, N, have been detected, i.e., I is equal to N, then step 104 passes control to step 105; otherwise, the process loops back to step 101 for the next zero crossing.

After detection of N zero crossings, step 105 computes FMAX, the maximum frequency to be checked; FMIN, the lowest frequency to be checked; and FINC, the increment by which the frequency parameter is augmented. At step 106, the storage location for the maximum value of $F^2$, FSQMAX, is initialized at zero and, at step 107, the working frequency value, WF, is set equal to FMIN.

The working frequency value, WF, is doubled and converted to a radial frequency RWF at step 108 by being multiplied by $4\pi$. At step 109, the storage locations for the accumulated sine and cosine terms, SINST and COSST, respectively, are initialized at zero. An indexing variable, I, again representing the number of the zero crossing of digital signal 10, is initialized to zero at step 110 and, at step 111, is incremented by one. At step 112, the argument ARG of the sine and cosine functions is computed by multiplying the radial frequency, RWF, by the time of occurrence of the Ith transition, T(I), previously stored during the Ith execution of step 103. At step 113, a new value of SINST is computed by adding its previous value to SIN(ARG) and, in a similar fashion at step 114, a new value of COSST is computed by adding its previous value to COS(ARG). Step 115 causes the process to loop back to step 111 until all of the N stored values of T(I) have been accessed.

The $F^2$ value, FSQ, as derived in Equation (10), is computed at step 116 by squaring the SINST and COSST terms and adding the squared values. If FSQ is not greater than FSQMAX, step 117 causes control to pass to step 120. Otherwise, FSQMAX takes on the value of FSQ at step 118 and, at step 119, the baud rate, BR, is temporarily computed to be the working frequency value. At step 120, WF is incremented and, if the new value of WF does not exceed the maximum frequency in the range of interest, FMAX, control passes to step 108, for computation of a new value for FSQ based on the augmented value of the working frequency.

By the time the process passes out from the "yes" exit of step 121, a baud rate value, BR, has been computed for which $F^2$ is a maximum within the frequency range of interest. Nevertheless, it may be that more accuracy of the baud rate may be achieved by providing finer steps of the incremented frequency. If this finer tuning is desired, step 122 passes control to step 123 where new values of WF, FMAX and FINC permit a closer look at the $F^2$ function on both sides of the BR value which provided the FSQMAX value. In this example, FINC takes on a value one-tenth of its previous value. Control then returns to step 108 for the computation of additional values of FSQ.

The above method was implemented within the stored program of a special purpose 16-bit signal processor comprising four AM2901 bit slices, sold by Advanced Micro Devices, Inc., of Sunnyvale, Calif. This implementation was tested using digital data having baud rates in the 30 to 3000 Hz range, typically voice data, and it was found to provide favorable results for values of N in the order of 50. For very low baud rates, the speed of execution for the process is limited by the time required to detect a sufficient number of zero crossings.

While the principles of the present invention have been demonstrated with particular regard to the illustrated structure and method of the figures, it will be recognized that various departures from such illustrative structure and method may be undertaken in practice of the invention. The scope of this invention is not intended to be limited to the structure and method disclosed herein but should instead be gauged by the breadth of the claims which follow.

What is claimed is:

1. A method for estimating the baud rate, f, of a digital signal having high-to-low and low-to-high transitions, said method comprising the steps of:
   a. detecting the zero-crossings of said high-to-low and low-to-high transitions of said digital signal;
   b. measuring the times of occurrence, T(1), T(2), ... T(N), of the detected zero-crossings of N successive transitions of said digital signal; and
   c. determining a value of f for which the expression $$\left[\sum_{i=1}^{N} \sin 4\pi f T(i)\right]^2 + \left[\sum_{i=1}^{N} \cos 4\pi f T(i)\right]^2$$

assumes a maximum value.

2. The method according to claim 1 wherein said determining step includes the following substeps:
   (1) selecting a current value of f;
   (2) computing a current value of said expression using said current value of f;
   (3) comparing said current value of said expression with a previously computed maximum value of said expression and, if said current value of said expression exceeds said previously computed maximum value, replacing said previously computed maximum value with said current value of said expression;
   (4) augmenting said value of f by a predetermined increment; and
   (5) repeating substeps (2) through (4) using said augmented value of f as said current value of f until said augmented value of f exceeds a predetermined maximum value.

3. The method according to claim 2 wherein said current value of f is selected in substep (1) as $f=(N-1)/2[T(N)-T(1)]$.

4. The method according to claim 2 wherein said predetermined increment of said augmenting substep is $\frac{1}{8}T(N)$.

5. The method according to claim 2 further including the following substep:
   (6) repeating substeps (1) through (5) wherein said selected current value of f assumes the value of f which preceded the value of f for which said expression assumed said maximum value; said predetermined maximum value of f assumes the value of f which followed the value of f for which said expression assumed said maximum value; and said predetermined increment is reduced.

6. The method according to claim 5 wherein the reduction factor of said predetermined increment is one-tenth.

7. An apparatus for estimating the baud rate, f, of a digital signal having high-to-low and low-to-high transitions, said apparatus comprising:
   means for providing clock signals;
   means for measuring the times of occurrence, T(1), T(2), ... , T(N), of N successive transitions of said digital signal, said measuring means including means coupled to said clock signal for detecting when said digital signal crosses a predetermined threshold level, and for generating information representative of the times of said crossings of said threshold level by said digital signal; and
   means for determining a value of f for which the expression $$\left[\sum_{i=1}^{N} \sin 4\pi f T(i)\right]^2 + \left[\sum_{i=1}^{N} \cos 4\pi f T(i)\right]^2$$

assumes a maximum value.

8. The apparatus according to claim 7 further including means coupled to said detecting means for counting said crossings of said threshold level by said digital signal.

9. The apparatus according to claim 7 wherein said determining means includes first and second addressable memories having address input terminals and data output terminals, said first and second memories providing at said data output terminals digital information representative of the sine and cosine functions, respectively, of digital representations of angles applied to said address input terminals.

10. The apparatus according to claim 7 wherein said determining means includes means for comparing the value of said expression obtained for a first value of f with the value of said expression obtained for a second value of f.

11. The apparatus according to claim 10 further including means responsive to said comparing means for storing, from between said first and second values of f, that value of f for which said expression assumes a greater value.

12. The apparatus according to claim 11 further including means for storing said greater value of said expression.

13. The apparatus according to claim 7 further including a shift register for storing digital representations of T(1), T(2), ... , T(N).

* * * * *